Patented Mar. 18, 1941

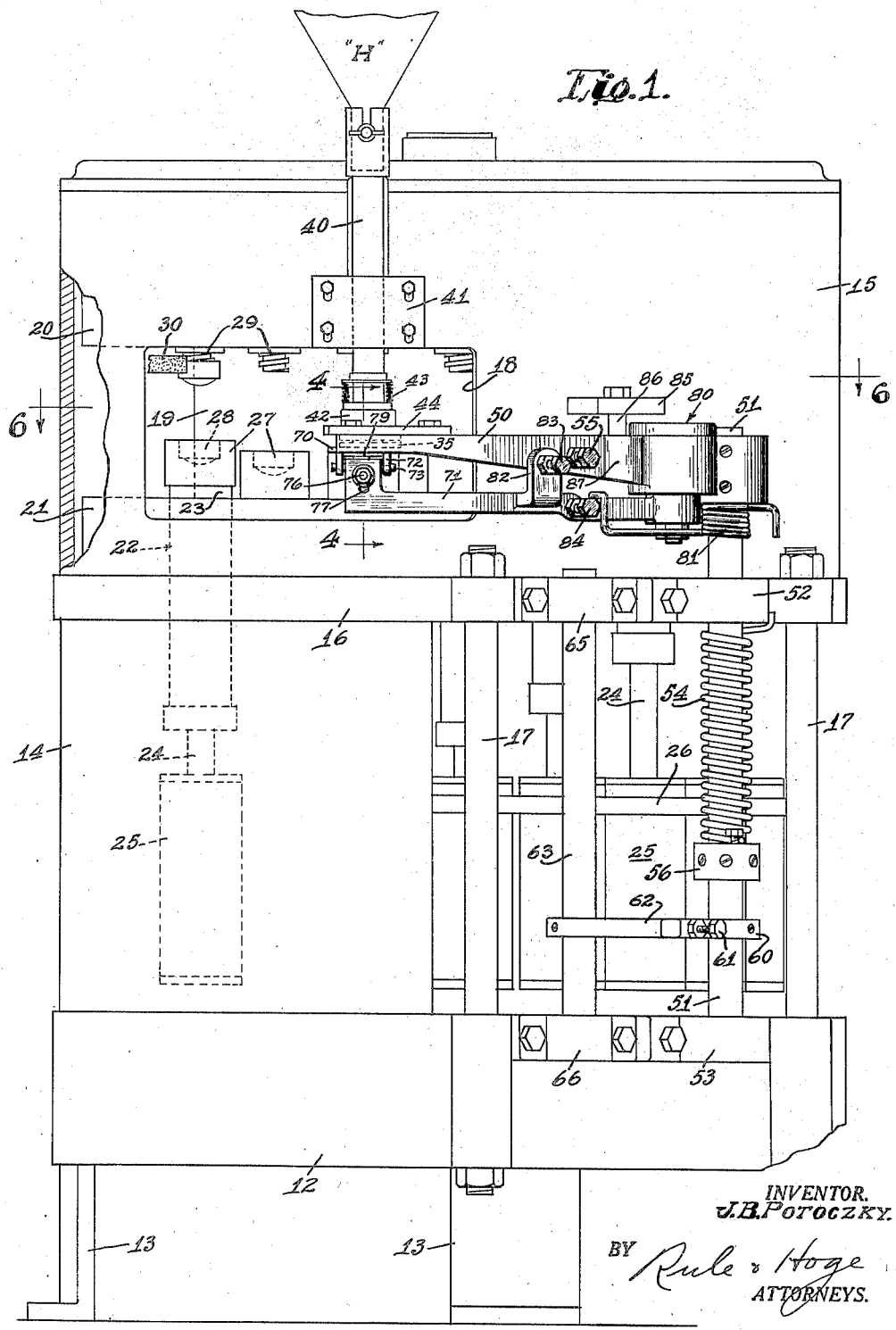

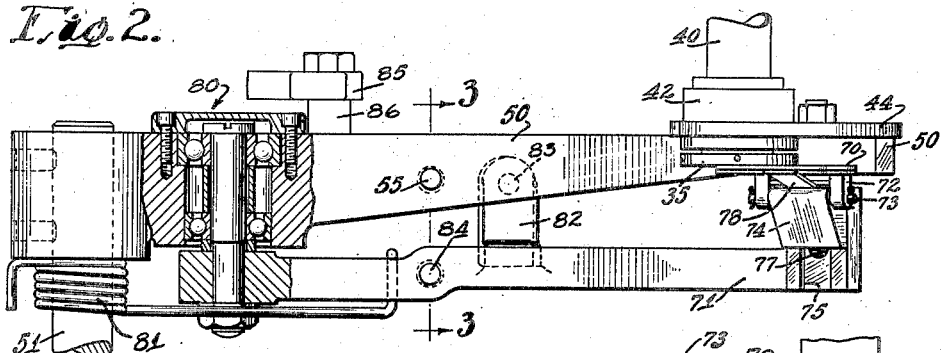
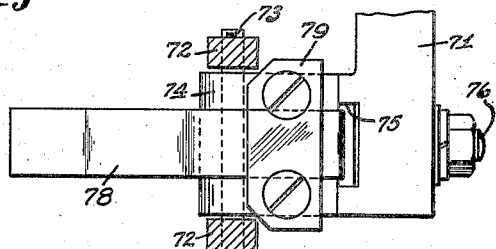
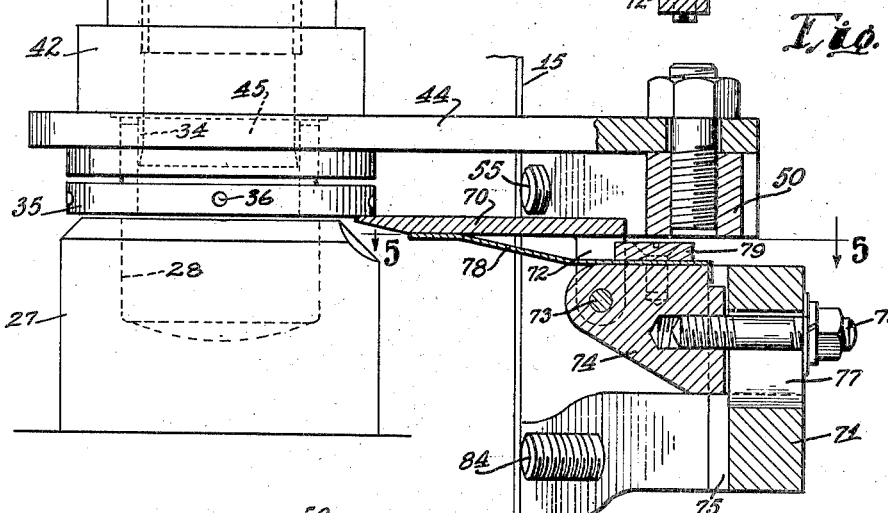
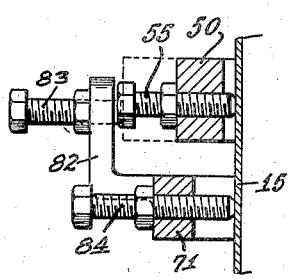

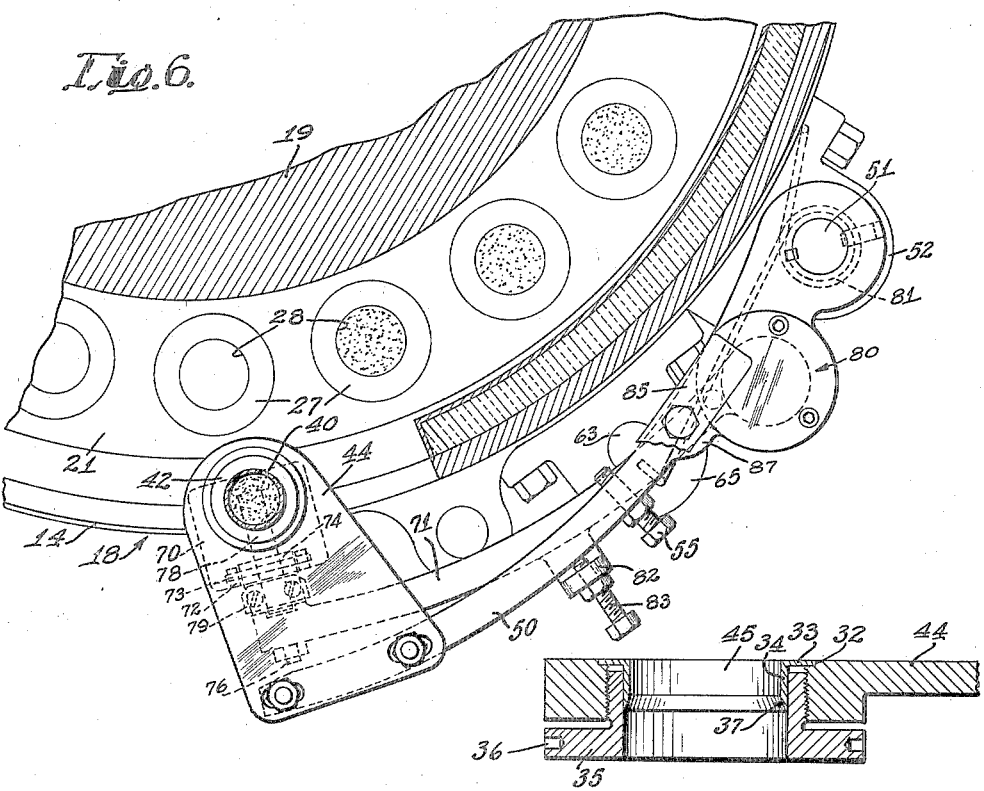
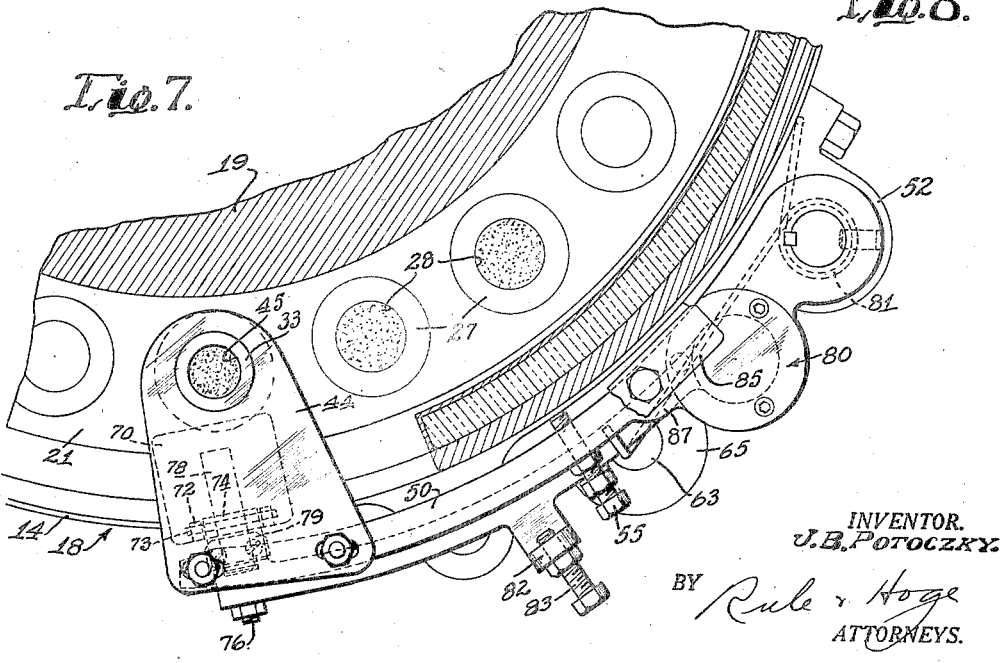

2,235,111

UNITED STATES PATENT OFFICE 2,235,111

FEEDING MECHANISM

Joseph B. Potoczky, Toledo, Ohio, assignor to Owens-Illinois Glass Company, a corporation of Ohio Application March 20, 1939, Serial No. 262,908

5 Claims. (Cl. 18—20)

The present invention relates to feeding mechanism for automatically transferring measured charges of granular or powdered moldable material from a supply body thereof contained in a hopper or other receptacle, to the individual molds of a molding machine.

The improved mechanism comprising the present invention is primarily adapted for use in connection with molding machines of the rotary type wherein a plurality of molding units or dies are moved progressively and continuously through a predetermined cycle of operations, the molding material being fed to the dies at one point in the cycle.

The principal object of the invention is to provide a rugged and durable feeding mechanism comprised of a minimum number of moving parts which may be attached to the casing or other stationary part of the molding machine and which will cooperate with the moving parts thereof in such a manner as to be actuated thereby.

Another object of the invention is to provide a feeding mechanism which will transfer measured charges of moldable material from a supply body thereof to the individual molds of the molding machine with practically no loss of material due to spilling thereof or to the creation of material dust in the atmosphere.

Yet another object of the invention is to provide such a mechanism which is readily adjustable to accommodate different machines or to accommodate the different operating characteristics of the same machine.

A further object of the invention is to provide a feeding mechanism for molding machines in which provision is made for varying the size or quantity of the measured charges to accommodate varying mold capacities.

Other objects of the invention, not at this time enumerated, will become apparent hereinafter.

In the accompanying drawings:

Fig. 1 is a fragmentary side elevational view of a molding machine, showing the improved feeding device attached thereto;

Fig. 2 is a fragmentary side elevational view, partly in section, of a charging arm and shutter arm assembly employed in connection with the present invention;

Fig. 3 is a sectional view taken substantially along the line 3—3 of Fig. 2;

Fig. 4 is a sectional view taken substantially along the line 4—4 of Fig. 1;

Fig. 5 is a sectional view taken substantially along the line 5—5 of Fig. 4;

Fig. 6 is an enlarged sectional view taken substantially along the line 6—6 of Fig. 1;

Fig. 7 is a sectional view similar to Fig. 6 showing the feeding device in the act of charging a mold; and Fig. 8 is a vertical sectional view taken through a charging plate construction employed in connection with the present invention.

Referring now to Fig. 1, the molding machine includes a base member 12 in the form of a ring which is supported upon legs 13. A casing 14 partially encloses the operative moving machine instrumentalities in the medial region of the machine while an upper casing 15 surrounds these instrumentalities, both casings 14 and 15 being secured to a ring or band 16 supported by means of tie rods 17 from the base member 12.

The upper casing 15 is formed with a slot or opening 18 therein at the front of the machine through which the various molds are supplied with moldable material and through which the formed articles are removed from the machine. Rotatably supported within the casing 15 adjacent the upper portion of the machine is a head 19 or drum having relatively thick continuous upper and lower radial flanges 20 and 21 respectively. The lower flange 21 is provided with a series of vertical bores 22 therein in which are supported for vertical sliding movement a plurality of cylindrical members 23 carrying piston rods 24 at their lower ends which are associated with an annular series of hydraulic cylinders 25 supported in the peripheral region of a rotary table 26. A mold 27 or die element having an open cavity 28 is supported on the upper end of each of the cylindrical members 23. The die elements are designed for cooperation with a series of mandrels 29 or male die elements which are aligned therewith and which are supported about the periphery of the upper flange 20. An ejecting mechanism 30 which is common to all of the mandrels 29 is provided for stripping the formed articles therefrom in the vicinity of the charging zone.

The moldable material is fed to the die elements 27 at the charging zone through the opening 18 in the casing 15 and immediately thereafter the charged die elements are elevated by the hydraulic cylinders 25 into forming cooperation with the mandrels 29. The die elements proceed through a forming cycle during which they are heated and the material therein is cured and, as they again approach the opening 18 they are lowered and the formed articles removed from the mandrels 29 by means of the ejecting mechanism 30. The operation is continuous.

The arrangement of parts thus far described is purely conventional insofar as the present invention is concerned and no claim is made herein to any novelty associated therewith, the present invention residing rather in the novel arrangement of the feeding device which will now be described in detail.

Referring again to Fig. 1, the moldable material is contained in a charging hopper H which communicates with a vertical chute 40 adjustably secured by means of a plate 41 to the casing 15 at the forward side of the machine. The lower end of the chute 40 terminates in the charging zone in the vicinity of the revolving molds or dies 27 and is provided with a sealing sleeve 42 which is telescopically mounted thereon and which is normally held by means of springs 43 in yielding engagement with a charging plate 44 which is slidable therebeneath. The charging plate 44 (see also Fig. 8) is formed with a charging opening 45 therein which is movable with the plate from a position of register with the chute 40 to positions of register with the individual dies 27.

The opening 45 is formed with a shoulder 32 at the upper end thereof on which there seats a ferrule 33 having a downwardly extending cylindrical flange 34. A bushing 35 is threadedly received in the opening 45 below the shoulder 32 and extends upwardly between the flange 34 and wall of the opening and is adjustable in the opening 45 by means of spanner notches 36 formed in the periphery thereof. The lower edge of the flange 34 is tapered as at 37 and fits closely against the inner wall of the bushing 35 to provide a substantially continuous surface thus providing a substantially cylindrical charging cavity the capacity of which may be varied by adjusting the position of the bushing 35 with respect to the ferrule 33. The ferrule 33 and bushing 35 are also replaceable and by varying the effective diameter of the charging cavity, molds of different capacity may be accommodated.

Referring now to Figs. 1, 6 and 7, the charging plate 44 is secured to the free end of a charging arm 50 for longitudinal adjustment thereon. The other end of the arm 50 (Fig. 6) is keyed for vertical adjustment to a vertically extending rock-shaft 51 which is mounted in bearings 52 and 53 secured to the ring 16 and base member 12 respectively. A coil spring 54 surrounding the rock-shaft 51 has one end thereof secured to an angularly adjustable collar 56 and its other end bent for engagement with the upper bearing 52. This spring applies a torque to the rock-shaft 51 in such a manner as to urge the charging arm 50 inwardly toward the molding machine so that the charging plate 44 normally assumes a charging relation with respect to the individual die elements 27. Angular adjustment of the collar 56 on the shaft 51 permits the tension of the spring 54 to be varied.

The innermost position of the charging plate 44 is controlled by means of a set screw 55 extending through the arm 50 and adapted to bear against the casing 15 to limit the inward swinging movement of the arm. It will be seen that by adjusting the position of the charging plate 44 on the charging arm 50 and by manipulating the set screw 55, the opening 45 in the plate 44 may be accurately aligned with the die cavities 28 of the various die elements when the charging plate 44 is in its innermost position.

Referring now to Fig. 1 wherein the actuating mechanism for the rock-shaft 51 is disclosed, a cam member 60 or follower is secured to the rock-shaft 51 adjacent the bottom thereof and is provided with a set screw 61 adapted to bear against a cam member 62 or rock-arm secured to a vertically extending rock-shaft 63 which is mounted in bearings 65 and 66 on the ring 16 and base member 12 respectively.

The coil spring 54, acting through the shaft 51, cam follower 60 and set screw 61, normally urges the cam member 62 inwardly and causes the same to be interposed in the path of movement of revolving series of hydraulic cylinders 25 and, by engagement with successive cylinders, to be actuated thereby.

In the outermost position of the cam member 62, the follower 60 is held outwardly away from the molding machine and the charging arm 50 and plate 44 assume the position shown in Fig. 6 wherein the charging opening 45 is in register with the lower end of the chute 40.

In the innermost position of the cam member 62, the inner end region thereof is in engagement with the side of one of the cylinders 25 and the follower 60 assumes its innermost position with the charging arm 50 and plate 44 assuming the position shown in Fig. 7 wherein the charging opening 45 is in register with the cavity 28 of one of the die elements 27.

The center-to-center distance between adjacent cylinders 25 being equal to the center-to-center distance between adjacent die elements 27, actuation of the charging arm 50 in timed relation to the arrival of the die elements at the charging zone will be attained regardless of the rate of speed at which the molding machine is driven and regardless of the fact that the cam member 62 at the precise moment of charging one of the die elements 27 cooperates with a cylinder 25 three times removed from the actuating cylinder for the die being charged.

In order to effectively close the bottom of the charging opening 45 in the charging plate 44 when the opening is in register with the chute 40, a closure plate 70 or shutter plate is tiltably mounted on one end of an arm 71 by means of lugs 72 pivoted to a cross-shaft 73 carried by a bracket 74 which is vertically adjustable in a guideway 75 formed near the free end of the arm 71 and which may be clamped in any desired position of adjustment by means of a clamping bolt 76 that extends through a slot 77 formed in the arm 71. A leaf spring 78 is clamped to the bracket 74 by means of a plate 79 and bears upwardly against the underneath side of the shutter plate 70 to maintain the latter flush with the lower end of the bushing 35 which defines the capacity of the charging opening 45. The arm 71 is pivoted by means of an antifriction bearing assembly 80 (Fig. 2) to the charging arm 50 at a point near the point of attachment of the latter to the vertical shaft 51. A coil spring 81 encircles the shaft 51, bears against the casing 15 at one end thereof, and bears against the arm 71 at the other end thereof to normally urge the same inwardly toward the forming machine. A lug 82 formed on the arm 71 extends upwardly therefrom and is provided with a set screw 83 extending therethrough which bears against the arm 50 and determines the relative position of the former arm with respect to the latter arm. By proper adjustment of the set screw 83 the shutter plate 70 may be caused to register with the charging opening 45 when the charging plate 44 is in its retracted position beneath the chute 40.

The shutter plate 70 is movable inwardly with the charging plate 44 as the latter moves inwardly to charge the dies 27. A set screw 84 extending through the arm 71 is designed for contact with the casing 15 to limit the inward swinging movement of the arm and terminate the inward movement of the shutter plate 70 when the forward edge thereof overlies the edge of the particular die cavity 28 which is about to receive a charge of the moldable material from the charging cavity 45 in the charging plate 44. The charging plate 44 however continues its inward movement until the charging cavity 45 is in registry with the die cavity 28 and thus the moldable material contained in the latter, no longer being supported on the shutter plate 70 falls by gravity into the cavity 28 of the mold 27.

In order to render the charging device inoperative as for example when it is desired to inspect the condition of the die elements, mandrels or other instrumentalities or to substitute die elements in the molding machine without ceasing operation of the latter, a locking member 85 (Fig. 1) is pivoted to a stud 86 extending upwardly from a boss 87 formed on the charging arm 50 and may be swung to a radial position with respect to the central axis of the machine to engage the casing 15 and hold the charging arm in its retracted position.

Modifications may be resorted to within the spirit and scope of the appended claims.

I claim:

1. Feeding mechanism for rotary molding machines of the type including an annular series of molds each having an upwardly presented mold cavity, and means for rotating the series of molds about a vertical axis to move the same through a charging zone, said mechanism including a vertical rock-shaft, a charging arm secured to the rock-shaft, a charging plate having a charging opening therein mounted on the charging arm, said plate being movable inwardly with the charging arm from a retracted position to a position wherein the opening therein is in register with a mold cavity at the charging zone, a second arm pivoted to the charging arm medially thereof and movable in unison therewith, a shutter plate mounted on the second arm, means normally urging the second arm to a position wherein the shutter plate underlies and closes the bottom of the opening in the charging plate, means independently limiting the inward movement of each arm, means actuating the rock-shaft in timed relation to movement of the molds through the charging zone, and means for supplying moldable material to the charging opening in the charging plate when the charging arm is in its retracted position.

2. Feeding mechanism for rotary molding machines of the type including a stationary casing, an annular series of molds mounted for rotation about a vertical axis within the casing, each mold having an upwardly presented mold cavity, and means for rotating said series of molds to move the same through a charging zone, said mechanism including a vertical rock-shaft disposed outside of the casing, a charging arm secured to the rock-shaft, a charging plate having a charging opening therein mounted on the charging arm, said plate being movable inwardly with the charging arm from a retracted position outside of the casing to a position within the casing wherein the charging opening is in registry with a mold cavity at the charging zone, a second arm pivoted to the charging arm medially thereof and movable in unison therewith, a shutter plate mounted on the second arm, means normally urging the second arm to a position wherein the shutter plate underlies the opening and closes the bottom of the same, a set screw extending through the charging arm and designed for engagement with the casing to limit the inward movement of the former, a set screw extending through the second arm and designed for engagement with the casing to limit the inward movement of the second arm, means for actuating the rock-shaft in timed relation to movement of the molds through the charging zone, and means for supplying moldable material to the charging opening in the charging plate when the charging arm is in its retracted position.

3. A feeding mechanism for supplying charges of moldable material from a supply chute to the upwardly presented mold cavities of a series of molds moving in succession through a charging zone comprising a vertical rock-shaft, a charging arm secured thereto, a second arm pivoted to the charging arm medially thereof, a charging plate having a charging opening therein secured to the charging arm, a shutter plate secured to the second arm, means yieldingly maintaining the second arm in fixed relation to the charging arm with the shutter plate underlying and closing the bottom of the opening in the charging plate, means for actuating the rock-shaft in timed relation to the movement of the molds through the charging zone to move the charging arm from a retracted position to a position wherein the charging opening is in register with a mold cavity at the charging zone, a stationary abutment, an abutment on each of the arms engageable with the stationary abutment to limit the movement of its respective arm, means for adjusting the position of each of said latter abutments, and means for supplying moldable material from the chute to the charging opening in the charging plate when the charging arm is in its retracted position.

4. In a feeding mechanism for supplying charges of moldable material from a supply chute to the upwardly presented mold cavities of a series of molds moving in succession through a charging zone, a rock-shaft, a charging arm secured to the rock-shaft at one end thereof, a charging plate having a charging opening therein secured to the free end of the charging arm, a second arm pivoted to the charging arm medially thereof, a bracket mounted on the outer end of the second arm, and vertically adjustable thereon, a shutter plate pivoted to the bracket, means normally maintaining said arms in fixed relationship with the shutter plate underlying the charging opening, means on the bracket normally urging the shutter plate into sealing engagement with the bottom of the opening, means for actuating the rock-shaft to move the charging arm from a retracted position to a position wherein the charging opening is in register with a mold cavity at the charging zone, an abutment positioned in the path of movement of the second arm to limit its movement during movement of the charging arm, and means for supplying moldable material from the chute to the charging opening in the charging plate when the charging arm is in its retracted position.

5. A charging plate for transferring measured charges of moldable material from a supply chute to the upwardly presented mold cavity of a forming mold in a plastic molding machine, there being a charging opening in said plate having an internal shoulder adjacent the top thereof, a ring-like ferrule including a lateral annular flange seated on the shoulder and a depending cylindrical portion concentric with the opening extending downwardly therein and spaced from the walls thereof, the walls of said opening below the shoulder being threaded, and a bushing threadedly received in said opening below the shoulder, said bushing extending below the bottom of the opening and the walls thereof filling the space between the walls of the opening and the cylindrical portion of the ferrule.

JOSEPH B. POTOCZKY.